United States Patent
Häfner et al.

(10) Patent No.: US 9,591,705 B2
(45) Date of Patent: Mar. 7, 2017

(54) ARRANGEMENT AND METHOD FOR OPERATING AN ARRANGEMENT

(71) Applicant: OSRAM Opto Semiconductors GmbH, Regensburg (DE)

(72) Inventors: Norbert Häfner, Lappersdorf (DE); Ulrich Frei, Obertraubling (DE); Stefan Grötsch, Bad Abbach (DE); Rainer Huber, Bad Abbach (DE)

(73) Assignee: OSRAM Opto Semiconductors GmbH, Regensburg (DE)

(*) Notice: Subject to any disclaimer, the term of this patent is extended or adjusted under 35 U.S.C. 154(b) by 0 days.

(21) Appl. No.: 14/653,816

(22) PCT Filed: Jan. 7, 2014

(86) PCT No.: PCT/EP2014/050141
§ 371 (c)(1),
(2) Date: Jun. 18, 2015

(87) PCT Pub. No.: WO2014/114486
PCT Pub. Date: Jul. 31, 2014

(65) Prior Publication Data
US 2015/0351176 A1    Dec. 3, 2015

(30) Foreign Application Priority Data

Jan. 23, 2013 (DE) .................. 10 2013 100 663

(51) Int. Cl.
*H05B 33/08* (2006.01)
*B60Q 1/14* (2006.01)

(52) U.S. Cl.
CPC ....... *H05B 33/0815* (2013.01); *B60Q 1/1407* (2013.01); *H05B 33/083* (2013.01);
(Continued)

(58) Field of Classification Search
CPC   H05B 33/0815; H05B 33/089; H05B 33/083; B60Q 1/1407
See application file for complete search history.

(56) References Cited

U.S. PATENT DOCUMENTS 8,513,896 B2    8/2013   Grebner
8,525,416 B2 *  9/2013   Roger ................ H05B 33/0827
                                                 315/192

(Continued)

FOREIGN PATENT DOCUMENTS

DE    102009025752 A1   12/2010
DE    102009025752 B2    6/2011
(Continued)

OTHER PUBLICATIONS

Howell, W.D., "App Note 11: An Overview of the Electronic Drive Techniques for Intensity Control and Colour Mixing of Low Voltage Light Sources such as LEDs and LEPs," Artistic License (UK) Ltd., XP055114996, May 2002, 9 pages.

*Primary Examiner* — Douglas W Owens
*Assistant Examiner* — Pedro C Fernandez
(74) *Attorney, Agent, or Firm* — Slater Matsil, LLP

(57) ABSTRACT

A method is set up to operate an arrangement that has N radiation-emitting semiconductor chips arranged in an electric series circuit. The arrangement includes multiple switching elements, wherein to each of the semiconductor chips one of the switching elements is connected electrically in parallel. The arrangement includes a controller for the mutually independent activation of the switching elements. The arrangement includes a constant current circuit for energizing the series circuit. When switching off, the respective semiconductor chip associated with a switching element is bridged electrically by the switching element. A protective module of the arrangement is set up to reduce or to prevent (Continued)

current peaks when one or more of the semiconductor chips is/are switched off.

8 Claims, 5 Drawing Sheets

(52) U.S. Cl.
CPC ....... *H05B 33/089* (2013.01); *H05B 33/0845* (2013.01); *Y02B 20/341* (2013.01)

(56) References Cited

U.S. PATENT DOCUMENTS

| | | | | |
|---|---|---|---|---|
| 2005/0232132 | A1* | 10/2005 | Ashdown | H04L 25/4927 370/204 |
| 2007/0262724 | A1* | 11/2007 | Mednik | H05B 33/0818 315/125 |
| 2008/0191642 | A1 | 8/2008 | Slot et al. | |
| 2010/0194274 | A1 | 8/2010 | Hoogzaad | |
| 2011/0068713 | A1 | 3/2011 | Hoogzaad et al. | |
| 2011/0121741 | A1 | 5/2011 | Yamamoto et al. | |
| 2011/0210670 | A1* | 9/2011 | Sauerlander | H05B 33/083 315/120 |
| 2011/0227490 | A1* | 9/2011 | Huynh | H05B 33/083 315/185 R |
| 2011/0273102 | A1 | 11/2011 | van de Ven et al. | |
| 2011/0285317 | A1* | 11/2011 | Grebner | H05B 33/083 315/297 |
| 2012/0243562 | A1 | 9/2012 | Maron et al. | |

FOREIGN PATENT DOCUMENTS

| | | |
|---|---|---|
| WO | 2005101916 A1 | 10/2005 |
| WO | 2009013676 A2 | 1/2009 |
| WO | 2010055456 A1 | 5/2010 |

* cited by examiner

ARRANGEMENT AND METHOD FOR OPERATING AN ARRANGEMENT

This patent application is a national phase filing under section 371 of PCT/EP2014/050141, filed Jan. 7, 2014, which claims the priority of German patent application 10 2013 100 663.9, filed Jan. 23, 2013, each of which is incorporated herein by reference in its entirety.

TECHNICAL FIELD

A method for operating an arrangement is specified. In addition, a corresponding arrangement is specified.

SUMMARY

Embodiments of the invention specify a method for operating an arrangement having a plurality of semiconductor chips, in which the semiconductor chips have a long service life.

According to at least one embodiment, the arrangement contains N radiation-emitting semiconductor chips. N is a natural number$\geq 2$. The semiconductor chips are preferably light-emitting diode chips. The semiconductor chips are configured in particular to generate visible light such as white light or colored light in operation.

According to at least one embodiment, the semiconductor chips are arranged in one or more electrical series circuits. A current strength of all semiconductor chips of a series circuit is therefore equal or approximately equal in operation of these semiconductor chips. The or each series circuit comprises, for example, at least two or three or four or six or eight semiconductor chips and/or at most 30 or 20 or 15 or 12 of the semiconductor chips. The semiconductor chips are preferably directly electrically connected to one another within the series circuit.

According to at least one embodiment, the arrangement comprises multiple switch elements. The switch elements are configured to turn the semiconductor chips on and off. The switch elements can be field effect transistors. A switching speed of the switch elements is, for example, at most 100 ns and/or at least 25 ns.

According to at least one embodiment, one or precisely one of the switching elements is electrically connected in parallel to each of the semiconductor chips or a group of semiconductor chips. If a plurality of the semiconductor chips are combined to form a group, the entire group is thus switchable via the associated switch element. The switch elements are configured in particular to activate the semiconductor chips via pulse width modulation (PWM). The switch elements are controlled, for example, by means of a switching voltage via activation and deactivation by a control unit. It is determined by means of the control unit for which fraction of time the respective semiconductor chips emit radiation.

According to at least one embodiment, the arrangement comprises a constant current source. The constant current source is configured to supply the at least one series circuit of the semiconductor chips with current.

According to at least one embodiment, in the event of deactivation, the semiconductor chip associated with a switch element is electrically bypassed by the switch element. In other words, a current then no longer flows through the semiconductor chip, but rather via this switch element. The semiconductor chip is thus short-circuited by the switch element in the event of deactivation.

According to at least one embodiment, the arrangement comprises at least one protection module. The one or the multiple protection modules are configured to reduce or prevent current spikes, caused in particular by the constant current source, in the event of deactivation of one or more of the semiconductor chips. The protection module can be implemented as an object, as hardware, and/or by programming, as software.

In at least one embodiment, the method is configured for operating an arrangement. The arrangement has N radiation-emitting semiconductor chips, wherein N is a natural number with $N \geq 2$. The semiconductor chips are arranged in at least one electrical series circuit. The arrangement furthermore comprises multiple switch elements, wherein one of the switch elements is electrically connected in parallel to each of the semiconductor chips or each group of semiconductor chips. The arrangement contains an activation unit for activating the switch elements independently of one another. The arrangement furthermore comprises a constant current source for energizing the series circuit. When it is turned off, the respective semiconductor chip associated with a switch element is electrically bypassed by the switch element. A protection module of the arrangement is configured to reduce or prevent current spikes in the event of one semiconductor chips or multiple semiconductor chips are turned off simultaneously.

In the case of light-emitting diode chips which are interconnected in a strand or are electrically interconnected in series, individual light-emitting diode chips can be turned on and off by field effect transistors lying in parallel. In this way, only one constant current source is required for the series circuit. However, in the event of a short-circuit of one or more of the light-emitting diode chips by the field effect transistors, current spikes occur, which are caused by a finite readjustment time of the constant current source. These current spikes can damage the light-emitting diode chips, in particular if such current spikes occur more frequently, for example, in the case of activation using PWM. Such current spikes can be reduced or prevented by the protection module. A service life of the light-emitting diode chips can be lengthened in this way.

According to at least one embodiment, the semiconductor chips of the arrangement or at least a part of the semiconductor chips are activated by pulse width modulation. A modulation period of the pulse width modulation has, for example, a total duration T of at most 10 ms or 5 ms or 2.5 ms, accordingly a modulation frequency of at least 100 Hz or 200 Hz or 400 Hz. At such modulation frequencies, flickering is generally no longer perceptible to the human eye when the light source is stationary.

According to at least one embodiment, the activation of the semiconductor chips is performed at a resolution of k bits. k is a natural number with $k \geq 3$ or $k \geq 6$. In particular, the activation is performed at 8 bits. The activation can also be performed, for example, at 4 bits, 10 bits, or 16 bits.

According to at least one embodiment, the modulation period has a shortest time slice t0. The shortest time slice t0 is, for example, equal to the total duration T of the modulation period divided by $2^k$. In the case of an activation at 8 bits and a modulation frequency of 400 Hz, the shortest time slice is then 2.5 ms:$2^8$, accordingly approximately 10 μs.

According to at least one embodiment, the semiconductor chips are activated by means of so-called bit angle modulation, BAM in short. In particular, it is a modified BAM.

In the case of a BAM, the modulation periods having the total duration T are subdivided into k time intervals. The time intervals have a duration of $2^m$ t0 with m elements [0;

k−1]$_N$ with t0≤T2$^{-k}$. The durations of the time intervals than each decreased by a factor of 2, for example, beginning with the modulation period.

In a modified BAM, the modulation period is subdivided into k or into k+1 time intervals. The length of at least k of the time intervals corresponds to the length of the time intervals of a non-modified BAM.

The time intervals are sorted by the protection module, increasing according to the number of the turned-on semiconductor chips in the respective time interval. That is to say the time interval having the smallest number of turned-on semiconductor chips is placed at the beginning of the modulation period. In this way, during the modulation period, a number of the turned-on semiconductor chips increases monotonously up to the last or next-to-last time interval.

The time intervals apply synchronously for all semiconductor chips in this case. That is to say, within the modulation period, the provided turning on times and turning off times are identical or nearly identical for all semiconductor chips. If a plurality of the time intervals have the same number of turned-on semiconductor chips, these time intervals can be exchanged with one another arbitrarily.

According to at least one embodiment, the modulation period is subdivided into k+1 of the time intervals. At the end of the next-to-last time interval of the modulation period, all semiconductor chips turned on in this time interval are turned off synchronously. Therefore, all semiconductor chips are then turned off in the last time interval. Alternatively, it is possible to also include this last time interval, in which all semiconductor chips are turned off, in the first time interval of the following modulation period.

According to at least one embodiment of the method, one or a plurality of the semiconductor chips are turned on and/or turned off two times or more frequently during the modulation period. An turned-on duration of the semiconductor chip is then not a coherent period of time within the modulation period, but rather the turned-on duration is subdivided into multiple separate sections within the modulation period.

According to at least one embodiment, the nth semiconductor chip is turned on during the modulation period for an turned-on duration $t_n$. The turned-on duration $t_n$ is composed of the total of the time intervals corresponding to the activation with the k bits. The formula $t_n \leq T$ applies.

According to at least one embodiment, the semiconductor chips are turned on during the modulation period in a coherent period of time, the turned-on duration. The semiconductor chips are turned on at a point in time T−$t_n$ with T−$t_n$>0 or T−$t_n$≥0 at or after the beginning of the modulation period by the protection module. Up to the end of the modulation period, the semiconductor chips then remain turned on. Therefore, semiconductor chips which are turned on during the modulation period are all synchronously turned off jointly at the end of the modulation period. A time interval of the modulation period, in which all semiconductor chips are turned off, can follow the shared turning off point in time.

According to at least one embodiment, only a part of the semiconductor chips is turned on at the beginning of the modulation period by the protection module, wherein this part of the semiconductor chips refers to all of those semiconductor chips which were turned on at any time in the course of the corresponding modulation period. Within the modulation period, at least one of the semiconductor chips is turned off by the protection module and another of the semiconductor chips is turned on simultaneously. In other words, the turned-on durations, during which the semiconductor chips are turned on, are shifted within the modulation period. The turned-on durations are preferably continuous, coherent periods of time.

According to at least one embodiment, the turned-on durations of the semiconductor chips are adapted to one another and shifted within the modulation period by the protection module so that a number of simultaneous turning-on operations and turning-off operations of the semiconductor chips is maximized. In other words, a number of events is then minimized, during which one of the semiconductor chips is turned off and turning on of another semiconductor chip does not oppose this turning off. Using such a method, the number and/or the level of current spikes during turning-off operations may be reduced or minimized.

According to at least one embodiment, target turned-on durations of the semiconductor chips are output by the activation unit. These target turned-on durations are changed by the protection module to obtain actual turned-on durations. A change of the target turned-on durations toward the turned-on durations by the protection module is preferably at most 15% or 10% or 5% of the total duration T of the modulation period. By way of such a modification of the target turned-on durations, every or almost every turning-off operation of semiconductor chips during the modulation period is opposed by a turning-on operation.

According to at least one embodiment, an auxiliary switch element is electrically connected in parallel jointly with all switch elements. The auxiliary switch element forms the protection module or a part thereof.

According to at least one embodiment, by way of the protection module, during turning-off operations of the semiconductor chips, the semiconductor chips and the associated switch elements are electrically bypassed by the auxiliary switch element. In other words, during a turning-off operation, the semiconductor chips are short-circuited by the auxiliary switch element. The auxiliary switch element is preferably a field effect transistor or a bipolar transistor having insulated gate electrode, IGBT in short. The auxiliary switch element bypasses the semiconductor chips in particular only within the modulation period. At an end of the modulation period, at which all semiconductor chips are turned off synchronously, it is not necessary for the auxiliary switch element to be switched.

According to at least one embodiment, during the turning off of the semiconductor chips, at least within the modulation period, a current supply from the constant current source toward the semiconductor chips is interrupted or reduced by the protection module. In other words, it is possible that at points in time at which semiconductor chips are turned off, the constant current source is configured to briefly output no current or only a lower target current strength.

According to at least one embodiment, during the turning on of the semiconductor chips, the target current strength of the constant current source is reduced in accordance with the fraction of the semiconductor chips to be turned off. The fraction of the semiconductor chips to be turned off relates to the semiconductor chips which are turned on immediately before the turning off. For example, if 50% of the presently turned-on semiconductor chips are turned off, the target current strength is preferably reduced by 50% or approximately 50% during the turning off. This adaptation of the target current strength is performed, for example, with a tolerance of at most 15% or 10% or 5% of the current which is provided by the constant current source in stationary operation.

According to at least one embodiment, the protection module comprises electrical resistors and electrical capacitors. The resistors and capacitors are interconnected and combined to form at least one RC element.

According to at least one embodiment, at least a part of the switch elements or all switch elements are each associated with an RC element. The corresponding switch element is preferably directly electrically connected to the associated RC element.

According to at least one embodiment, the RC elements associated with the switch elements have different time constants. The time constant results in this case approximately from the product of resistance and capacitance. It is therefore achievable that the switch elements do not switch exactly synchronously, but rather switch with a time delay in relation to one another. A number of semiconductor chips to be turned off simultaneously is thus reduced, whereby the level of the current spikes may be reduced.

According to at least one embodiment, the time constants differ at most by a smallest time slice or by at most 50% or 25% of the smallest time slice of the pulse width modulation. If the arrangement is operated by means of BAM, a difference between the time constants is thus preferably at most 25% of the total duration of the modulation period. In this way, it is possible to prevent turning-off points in time from various modulation periods from being coincident.

According to at least one embodiment, all semiconductor chips in the series circuit are structurally identical. In particular, the semiconductor chips are then configured, in the scope of the manufacturing tolerances, for emitting light of the same spectral composition. For example, the semiconductor chips are each white-emitting light-emitting diode chips.

According to at least one embodiment, the semiconductor chips in the series circuit have different emission characteristics. In particular, color temperatures of the radiation emitted by the semiconductor chips, for example, white light, can differ from one another. The semiconductor chips can also emit red, green, and blue light, so that an RGB module is assembled. An emitted color is then settable and chronologically variable by the activation of the semiconductor chips.

In addition, an arrangement is specified. The arrangement is configured for a method as described in conjunction with one or more of the above-mentioned embodiments. Features of the arrangement are therefore also disclosed for the method and vice versa.

In at least one embodiment, a method is carried out on the arrangement as specified above. The arrangement is preferably installed in an adaptive front lighting system or AFS in short. An adaptation is performed by the activation of the semiconductor chips. Such a vehicle headlight can be free of mechanical and/or optical moving components. An adaptation of the emission characteristic can be performed exclusively by turning the semiconductor chips on and off.

BRIEF DESCRIPTION OF THE DRAWINGS

A method described here and an arrangement described here are explained in greater detail hereafter with reference to the drawing on the basis of exemplary embodiments. Identical reference signs specify identical elements in the individual figures in this case. However, references are not shown to scale in this case, rather, individual elements can be shown exaggeratedly large for better comprehension.

In the figures.

DETAILED DESCRIPTION OF ILLUSTRATIVE EMBODIMENTS

Figure 1A:
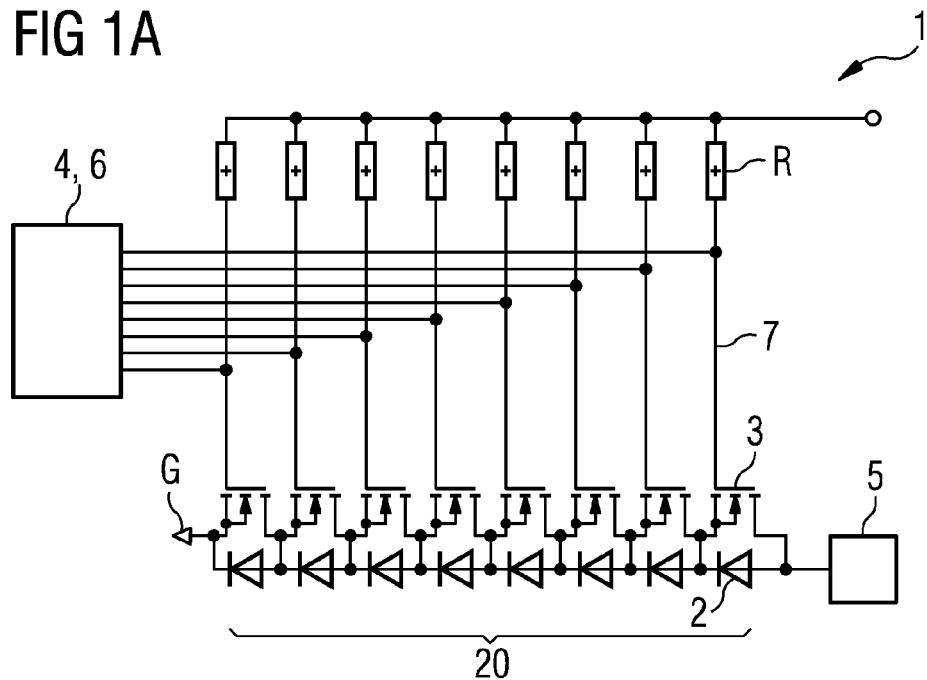
FIGS. 1A, 5B, 7, and 8 show schematic circuit diagrams of exemplary embodiments of arrangements described here.

FIG. 1A schematically shows a circuit diagram of an arrangement 1. The arrangement 1 comprises a series circuit 20 of semiconductor chips 2. The semiconductor chips 2 are in direct electrical succession inside the series circuit 20. The semiconductor chips 2 are supplied with current from a constant current source 5. The series circuit 20 can be connected directly to a ground contact G in particular.

Furthermore, the arrangement 1 comprises multiple switch elements 3. The switch elements 3 are, for example, field effect transistors, in particular so-called MISFET or MOSFET. The switch elements 3 are shown as n-channel field effect transistors of the enrichment type. The switch elements 3 are therefore transmissive to current from the constant current source 5 toward the ground contact G, if a sufficiently high negative control voltage is applied.

Notwithstanding the illustration, it is also possible that a plurality of the semiconductor chips 2 is associated with one switch element 3. The semiconductor chips 2 are then combined to form a group and preferably electrically connected in series. Furthermore, the arrangement 1 can comprise additional electronic components, for example, for impedance adaptation or for an overvoltage protection, which are not shown in the figures in each case.

To activate the switch elements 3, the arrangement 1 comprises an activation unit 4. The switch elements 3 are each individually electrically connected to the activation unit 4 and are activatable independently of one another. The activation unit 4 is only shown in simplified form. The activation unit 4 particularly comprises a microcontroller and optionally a shift register and also further components, which are not shown in each case. In particular, no data lines to the activation unit 4 are shown.

Electrical lines 7 from the activation unit 4 to the switch elements 3 are located between resistors R toward a high potential. The resistors R are so-called pull-up resistors.

Furthermore, a protection module 6 is implemented in the activation unit 4, in particular by programming. Current spikes in the event of turning off of individual semiconductor chips 2 can be prevented or reduced by the protection module 6. An activation of the semiconductor chips 2 via the switch elements 3 is preferably performed via pulse width modulation (PWM).

Figure 2A:
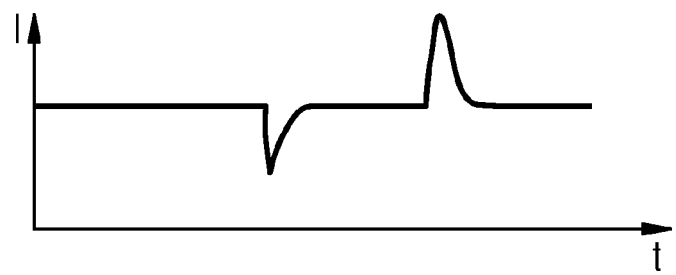
FIG. 2 shows a schematic time curve of an activation and a current curve.
Figure 2B:
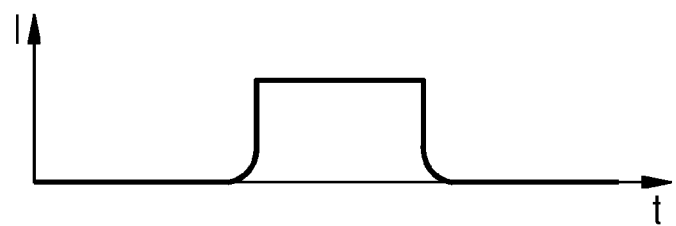

FIG. 2B schematically shows a time curve of an activation of one of the semiconductor chips 2 and FIG. 2A shows the curve of a current I of the constant current source 5 as a function of the time t.

If one of the semiconductor chips 2 is turned on, the resistance of the series circuit 20 thus rises at this point in time. In this way, the current I from the constant current source 5 briefly decreases, until the constant current source 5 has readjusted. If it is turned off, in contrast, a sudden reduction of the resistance of the series circuit 20 occurs and the current I increases briefly, until the constant current source 5 has readjusted. The resistance increase occurs because the corresponding semiconductor chip 2 is short-circuited by the switch element 3 and a current flows from the constant current source 5 to the ground contact G past the semiconductor chip 2 via the associated switch element 3. Such current spikes shorten the service life of the semiconductor chips 2.

Figure 1B:
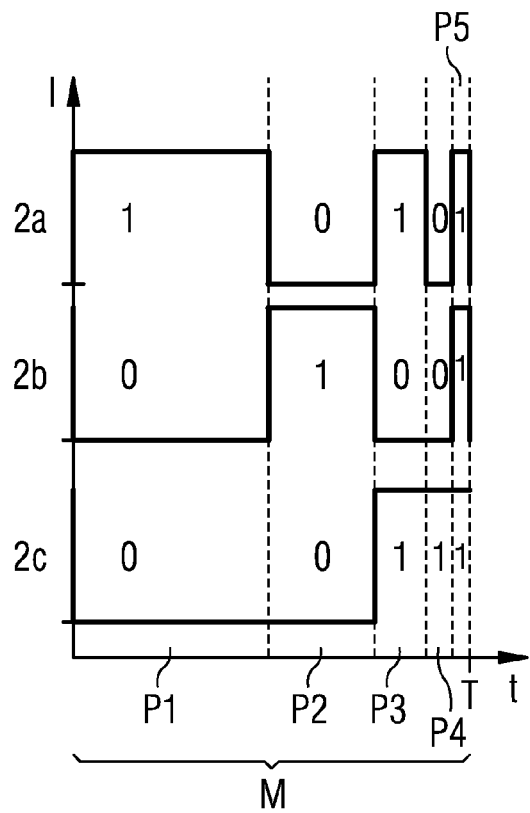
FIGS. 1B, 1C, 3, 4, 5A, 6, and 9 show schematic illustrations of methods described here.

A BAM method for operating the semiconductor chips is illustrated in FIG. 1B. To simplify the illustration, according to FIG. 1B, only three semiconductor chips 2a, 2b, 2c are operated. In a modulation period M having a total duration T, the semiconductor chips 2a, 2b, 2c are activated in time intervals P1, P2, P3, P4, P5. The time intervals P1-5 each become shorter with the time t and each decrease by a factor of 2, in relation to the preceding time interval.

Corresponding to a bit sequence of the activation, in the example of the semiconductor chip 2a this is 10101, the semiconductor chip 2a is energized in the time intervals P1, P3, and P5. This applies similarly to semiconductor chips 2b, 2c.

Figure 1C:
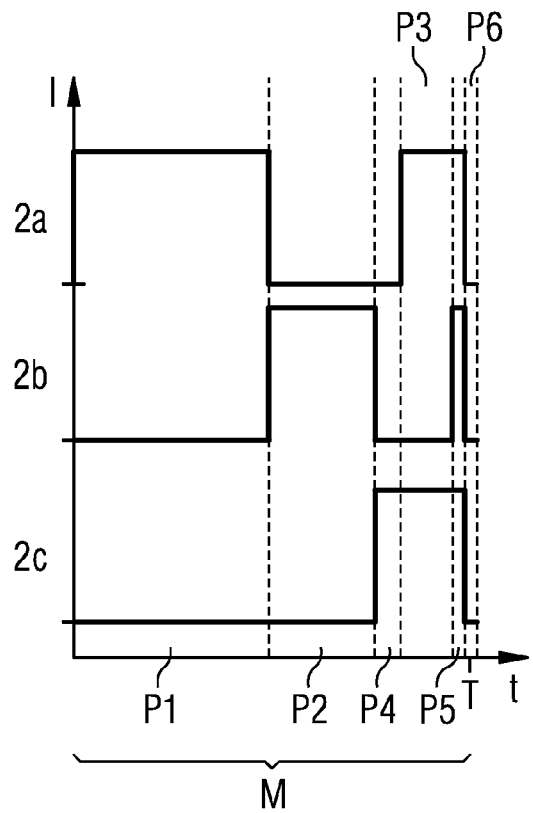

In a method described here, see FIG. 1C, which is implemented by the protection module 6, the time intervals P1-5 are resorted, so that during the modulation period M, a number of the turned-on semiconductor chips 2a, 2b, 2c increases monotonously, at least up to the next-to-last time interval P5. The time intervals P3 and P4 are exchanged in their sequence by the protection module 6 in the present example. In the time intervals P2, P3, P4, one of the semiconductor chips 2a, 2b, 2c is turned on in each case in the example, in the time interval P3, the two semiconductor chips 2a, 2c are turned on, and in the next-to-last time interval P5, all three semiconductor chips 2a, 2b, 2c are turned on.

Optionally, a last time interval P6 follows, in which all semiconductor chips 2a, 2b, 2c are turned off. A length of the time interval P6 can correspond to the length of the shortest of the time intervals P1-5. Activation points in time, i.e., the change between the time intervals P1-5, are identical for all semiconductor chips 2a, 2b, 2c.

During such a method, at least one turning-on operation opposes each turning-off operation of one of the semiconductor chips 2a, 2b, 2c, so that current spikes are avoided. All semiconductor chips are turned off synchronously between the time intervals P5 and P6, so that an elevated current does not act on any of the semiconductor chips 2a, 2b, 2c.

Figure 3A:
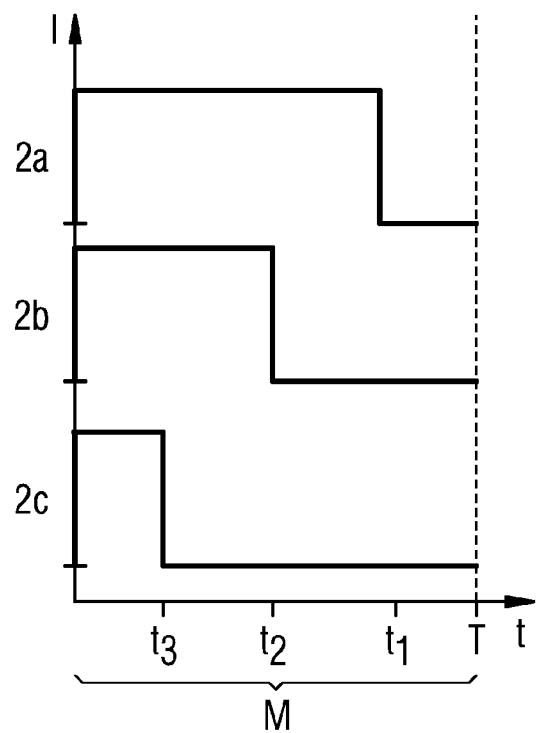

A further exemplary embodiment of the method implemented by the protection module 6 is illustrated in FIG. 3. The semiconductor chips 2a, 2b, 2c are operated during the modulation period M with coherent turned-on durations t1, t2, t3. In a conventional PWM method, see FIG. 3A, all semiconductor chips 2a, 2b, 2c are turned on at the beginning of the modulation period M and turned off in succession in the course of the modulation period M.

Figure 3B:
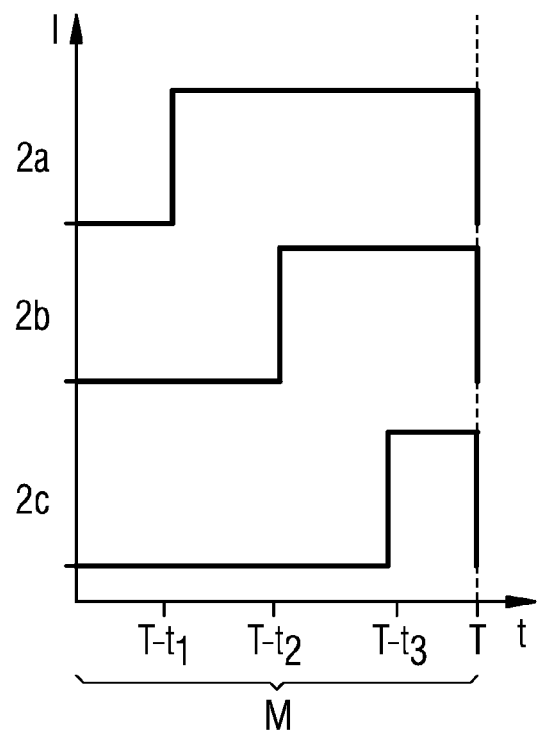

In the method described here, see FIG. 3B, the semiconductor chips 2a, 2b, 2c are turned on in the course of the modulation period M, corresponding to the respective turned-on durations t1, t2, t3. In this way, all semiconductor chips 2a, 2b, 2c are turned off synchronously at the end of the modulation period M. Therefore, no current spikes occur at the semiconductor chips 2 themselves.

Figure 4A:
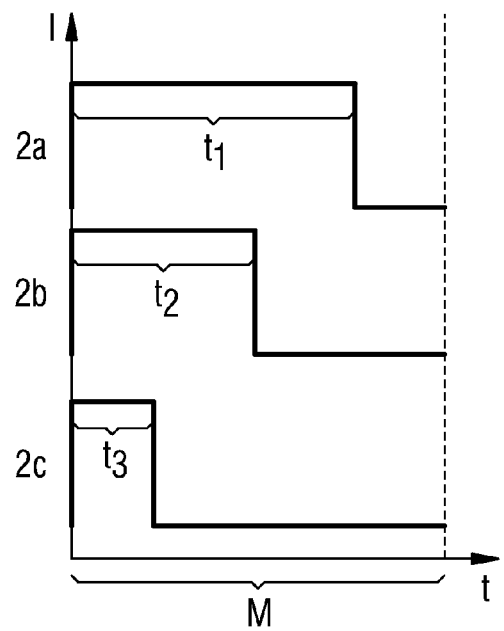
Figure 4B:
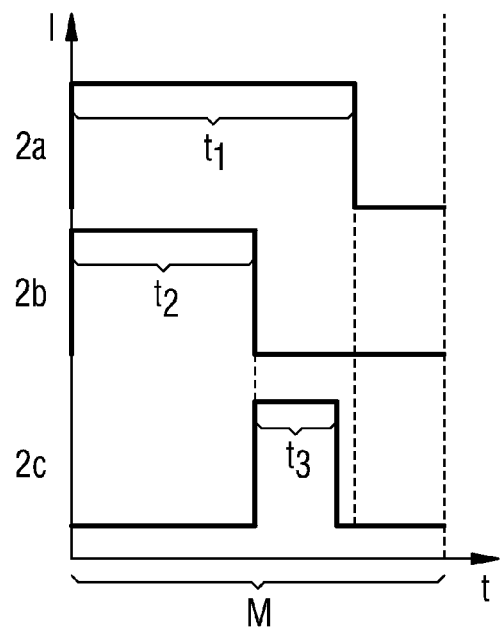

In the exemplary embodiment of the pulse width modulation, as shown in FIG. 4B, the coherent turned-on durations t1, t2, t3 are resorted within the modulation period M so that a number of turning-off operations, which are not opposed by a turning-on operation, is minimized. FIG. 4A corresponds to FIG. 3A in this case.

In contrast to the illustration in FIG. 4B, it is optionally possible that the turned-on durations t1, t2, t3 are also changed in their length by the protection module 6. For example, the turned-on duration t3 of the semiconductor chip 2c can be slightly lengthened and the turned-on duration t1 of the semiconductor chip 2a can be slightly lengthened, so that the turning-off points in time are coincident and during the turning off, none of the semiconductor chips 2a, 2b, 2c is in operation, whereby current spikes also do not reach the semiconductor chips 2a, 2b, 2c. No significant change of the emission characteristic occurs due to only slight changes of the turned-on durations t1, t2, t3.

It is optionally possible that the protection module 6, within the illustrated modulation period M or in further modulation periods M, corrects a change of the spectral emission characteristic because of the changed turned-on durations t1, t2, t3 by way of a further adaptation of the turned-on durations t1, t2, t3. Furthermore, at least one of the turned-on durations t1, t2, t3, in contrast to the illustration, can optionally also be allocated to two or more separate activation intervals, to be able to oppose every turning-off operation within the modulation period M with at least one turning-on operation.

Figure 5A:
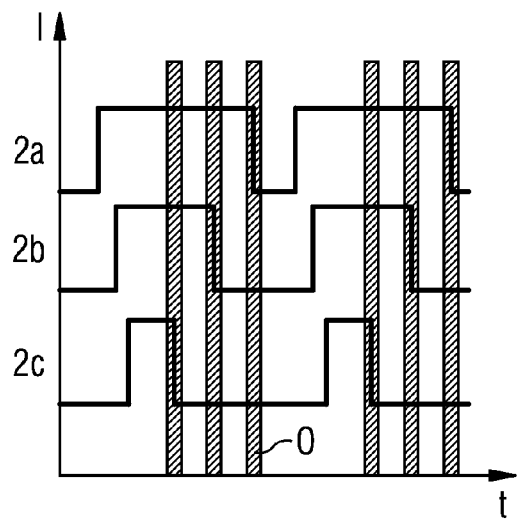

In the method as shown in FIG. 5A, the current supply to the semiconductor chips 2 through the protection module 6 is briefly interrupted in each case during turning-off intervals O. Therefore, no current spikes can occur in turning-off time windows O.

Figure 5B:
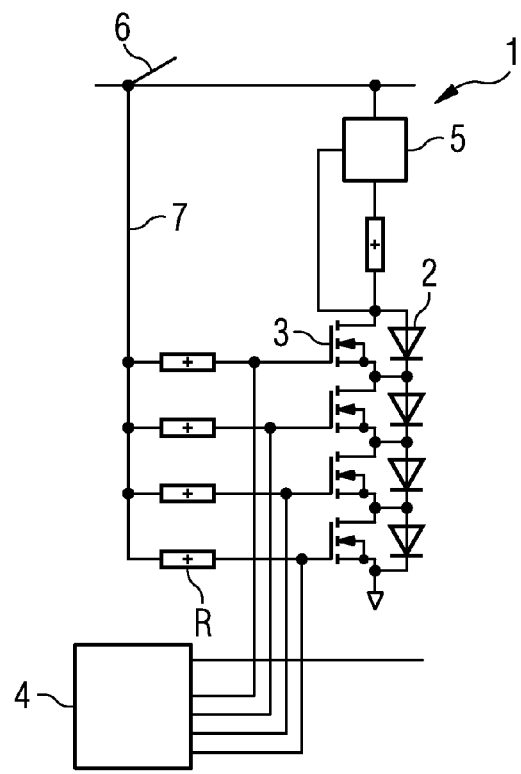

As in FIG. 5B, the protection module 6 is then implemented, for example, by a switch, which temporarily interrupts a current supply. The associated circuit is implemented, for example, as a linear regulator.

Figure 6:
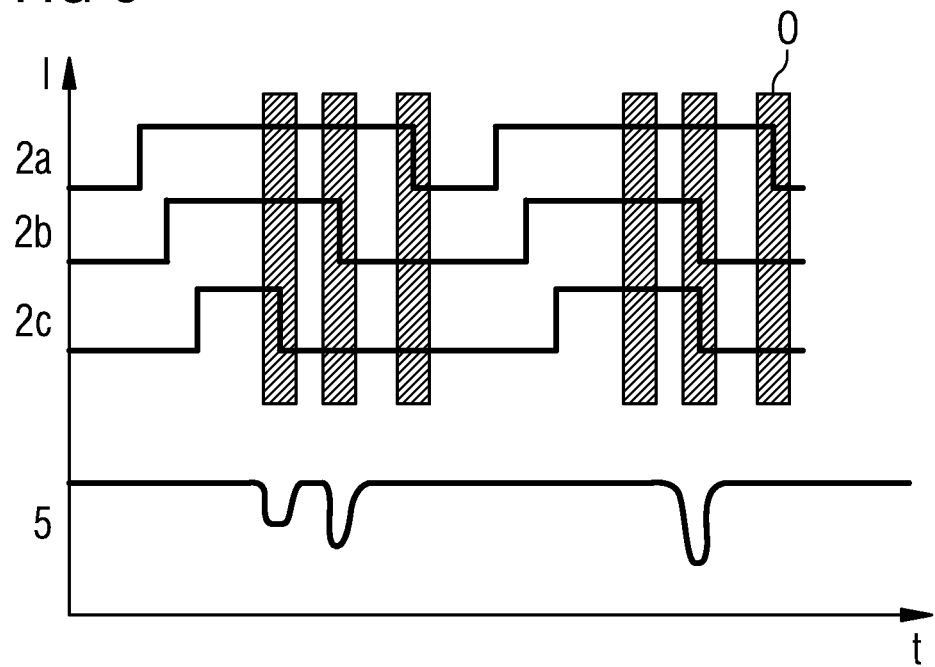

According to FIG. 6, in the turning-off time windows O, a target current strength of the constant current source 5 is only reduced by the protection module 6, in particular by a microcontroller-generated switch regulator signal, see the lowermost curve in FIG. 5. A current supply from the constant current source 5 to the semiconductor chips 2a, 2b, 2c is thus not completely interrupted. The reduction of the target current strength is preferably performed corresponding to the fraction of the presently turned-on semiconductor chips, which are turned off.

For example, if one of three semiconductor chips is turned off, the target voltage is thus preferably reduced by one-third. If one of two semiconductor chips is turned off, the reduction of the target voltage is performed by approximately 50%. In this way, the reduced target current strength of the constant current source 5 is approximately compensated for by the current spikes during the turning off. If the last of the semiconductor chips 2a is turned off, the target current strength does not have to be reduced from the constant current source 5.

A regulating time of the constant current source 5 is preferably, as also in all other exemplary embodiments, shorter than a shortest time slice of the pulse width modulation. A readjustment of the constant current source 5 can then be performed significantly more rapidly than the modulation of the semiconductor chips 2a, 2b, 2c.

Figure 7:
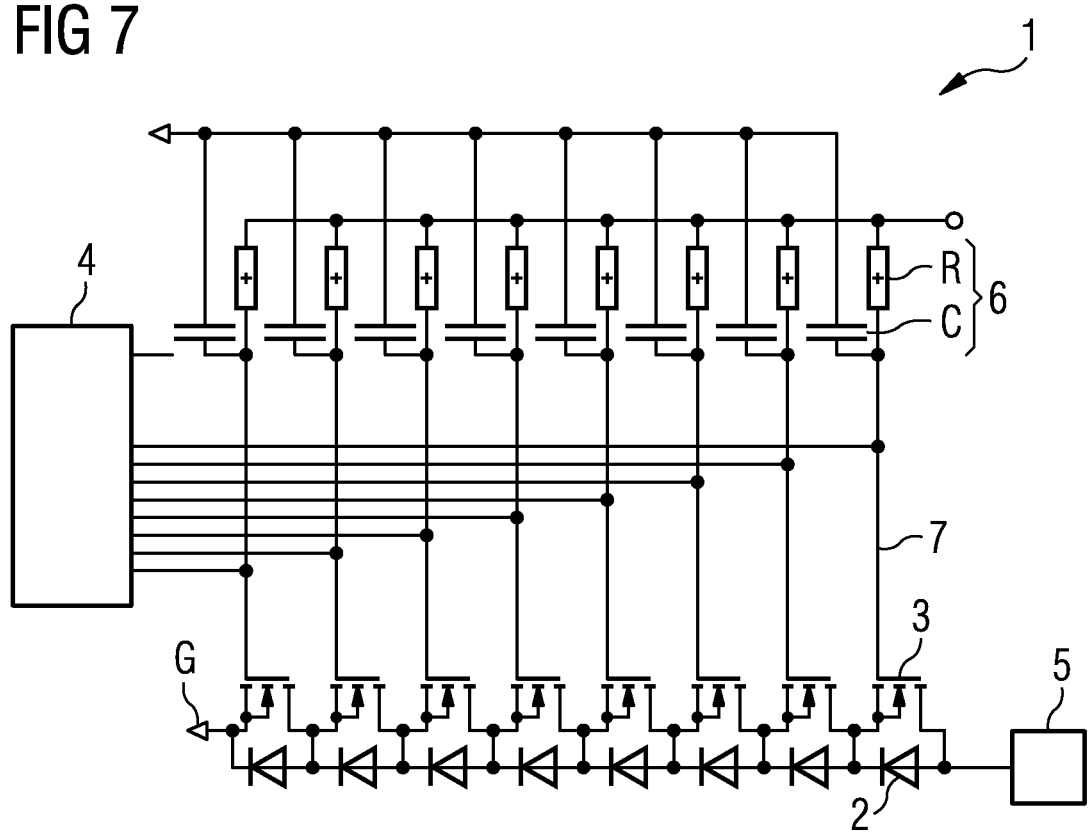

In the arrangement 1 according to FIG. 7, the protection module 6 is formed by RC elements, which are electrically connected to the switch elements 3. If activation pulses arrive simultaneously from the activation unit 4, a switching point in time of the switch elements 3 is delayed by different amounts by the RC elements. The RC elements preferably have time constants which are different from one another in this case. It is therefore possible to prevent a plurality of the semiconductor chips 2 from being turned off at the same time. A level of the current spikes can thus be reduced.

Figure 8:
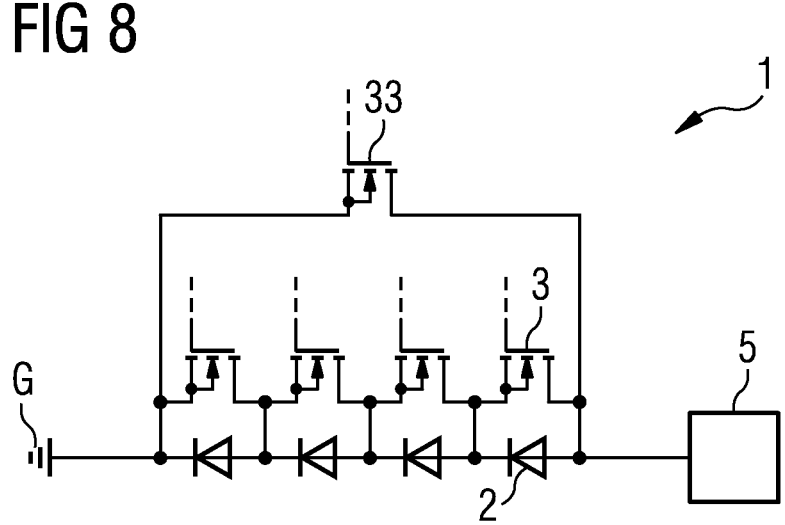

In the exemplary embodiment of the arrangement 1 according to FIG. 8, an auxiliary switch element 33 is connected in parallel to the switch elements 3. During turning-off operations of the semiconductor chips 2, the auxiliary switch element 33 is switched, so that all semiconductor chips 2 are then electrically short-circuited and a current flow occurs via the auxiliary switch element 33. Current spikes can also be avoided in this way.

It is possible in each case that a programming implementation of the protection module is combined with a change of the switch structure of the arrangement. Thus, for example, the arrangement according to FIG. 8 is combinable with the method according to FIG. 4, for example.

Figure 9:
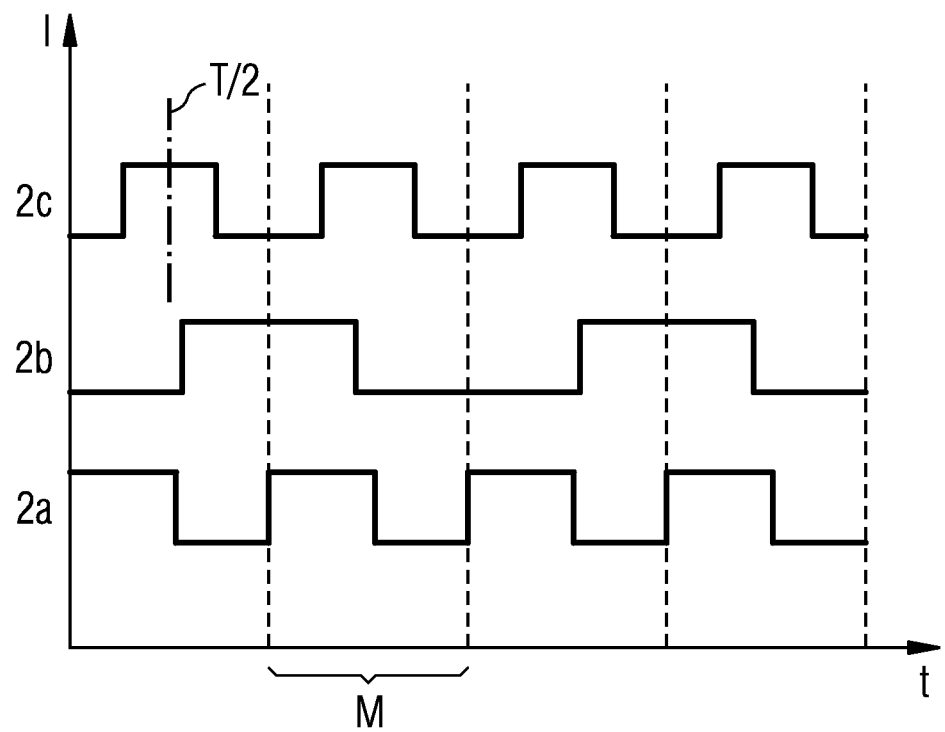

In the method according to FIG. 9, a first semiconductor chip 2a is turned on at the beginning of the modulation period M and a second semiconductor chip 2b is turned on so that it is turned off at the end of the modulation period M. Therefore, the turning-on operations and the turning-off operations are randomly distributed and a probability of simultaneous switching is reduced.

In contrast to the illustration in FIG. 9, preferably a first group of semiconductor chips is activated in accordance with the first semiconductor chip 2a and a second group of semiconductor chips is activated in accordance with the second semiconductor chip 2b. To simplify the illustration, however, only the two semiconductor chips 2a, 2b are shown. According to FIG. 9, the second group of semiconductor chips 2b is only activated in such a manner in every second modulation period M, wherein such an activation is also possible in all modulation periods M.

It is also optionally possible that a third group of semiconductor chips 2c (not shown) is activated so that the turned-on durations of the semiconductor chips are each symmetrically arranged around a point in time T/2 of a modulation period M. The groups preferably have an equal number of semiconductor chips or a number which deviates by at most two from one another.

The invention described here is not restricted by the description on the basis of the exemplary embodiments. Rather, the invention comprises every novel feature and every combination of features, which includes in particular every combination of features in the patent claims, even if this feature or this combination is not explicitly specified itself in the patent claims or exemplary embodiments.

The invention claimed is:

1. A lighting apparatus installed in an adaptive vehicle headlight, the apparatus comprising:
    N radiation-emitting semiconductor chips coupled in an electrical series circuit, N being a natural number with N≥2;
    a plurality of switch elements, wherein each semiconductor chip or a group of semiconductor chips is connected in parallel with a respective one of the switch elements so that each semiconductor chip or group of semiconductor chips is electrically bypassed by the respective switch element when that semiconductor chip or group of semiconductor chips is turned off;
    a controller configured to activate the switch elements independently of one another;
    a constant current source coupled to energize the series circuit; and
    a protection module arranged to reduce or prevent current spikes when one or more of the semiconductor chips are turned off,
    wherein the semiconductor chips are activated by a pulse width modulation,
    wherein a $n^{th}$ semiconductor chip is turned on during a modulation period with a total duration T for a coherent turned on duration $t_n$ with $t_n \leq T$ and $n \in [1;N]\mathbb{N}$,
    wherein only a part of the semiconductor chips is turned on by the protection module at a beginning of the modulation period,
    wherein at least one of the semiconductor chips is turned off and simultaneously another of the semiconductor chips is turned on by the protection module within the modulation period,
    wherein turned on durations $t_n$ are adapted to one another and shifted within the modulation period by the protection module so that at least some of the target turned on durations of the semiconductor chips output by the controller are changed by the protection module by up to 10% of the total duration T to obtain the actual turned on durations $t_n$, and
    wherein a number of events is minimized, during which one of the semiconductor chips is turned off and a turning on of another semiconductor chip does no oppose this turning off so that a number of simultaneous turning-on operations and turning-off operations of the semiconductor chips is maximized.

2. The lighting apparatus according to claim 1, wherein an auxiliary switch element of the protection module is electrically connected in parallel jointly to all switch elements, and wherein during the turning off of the semiconductor chips, by switching of the switch elements, in each case the semiconductor chips are electrically bypassed by the auxiliary switch element.

3. The lighting apparatus according to claim 1, wherein the protection module comprises electrical resistors and electrical capacitors, which form RC elements, and wherein at least a part of the switch elements are each connected to one RC element and the RC elements have different time constants.

4. The lighting apparatus according to claim 3, wherein the time constants differ at most by a shortest time slice of the pulse width modulation.

5. The lighting apparatus according to claim 1, wherein all semiconductor chips are structurally identical and are configured to emit light of the same spectral composition.

6. A lighting apparatus installed in an adaptive vehicle headlight, the apparatus comprising:
    N radiation-emitting semiconductor chips coupled in an electrical series circuit, N being a natural number with N≥2;
    a plurality of switch elements, wherein each semiconductor chip or a group of semiconductor chips is connected in parallel with a respective one of the switch elements so that each semiconductor chip or group of semiconductor chips is electrically bypassed by the respective switch element when that semiconductor chip or group of semiconductor chips is turned off;
    a controller configured to activate the switch elements independently of one another;
    a constant current source coupled to energize the series circuit; and
    a protection module arranged to reduce or prevent current spikes when one or more of the semiconductor chips are turned off,
    wherein the semiconductor chips are activated by bit angle modulation,
    wherein the activation is performed at a resolution of k bits with $k \in \mathbb{N}$ and with k>3,
    wherein a modulation period has a total duration T,
    wherein the modulation period is subdivided into k+1 time intervals, which apply for all semiconductor chips,
    wherein durations of k of the time intervals are $2^m t_o$ with $m \in [0;k-1]\mathbb{N}$ and with $t_o = T \, 2^{-k}$, wherein a $n^{th}$ semiconductor chip is turned on during the modulation period with a total duration T for a turned on duration $t_n$ and $t_n$ is composed of the total of the time intervals corresponding to the activation with the k bits with $t_n < T$; and $n \in [1;N] \mathbb{N} N$, wherein the time intervals are sorted by the protection module according to the number of the semiconductor chips turned on in the respective time interval so that the time interval having the smallest number of turned on semiconductor chips is placed at a beginning of the modulation period and during the modulation period, a number of the turned on semiconductor chips increases monotonously up to an next-to-last time interval, wherein at an end of the next-to-last time interval of the modulation period, all semiconductor chips turned on in the time interval are turned off synchronously so that in the last time interval, all semiconductor chips are turned off, and wherein at least one of the semiconductor chips is turned on at least twice and also turned off at least twice during the modulation period.

7. The lighting apparatus according to claim 6, wherein an auxiliary switch element of the protection module is electrically connected in parallel jointly to all switch elements, and wherein during the turning off of the semiconductor chips, by switching of the switch elements, in each case the semiconductor chips are electrically bypassed by the auxiliary switch element.

8. The lighting apparatus according to claim 6, wherein all semiconductor chips are structurally identical and are configured to emit light of the same spectral composition.

* * * * *

UNITED STATES PATENT AND TRADEMARK OFFICE
CERTIFICATE OF CORRECTION

PATENT NO. : 9,591,705 B2
APPLICATION NO. : 14/653816
DATED : March 7, 2017
INVENTOR(S) : Haefner et al.

Page 1 of 1

It is certified that error appears in the above-identified patent and that said Letters Patent is hereby corrected as shown below:

In the Claims

In Column 11, Line 5, Claim 6, delete "n ∈ [1; N] ℕ N," and insert --n ∈ [1; N] ℕ,--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*